R. J. WHITE.
APPARATUS FOR THE CONTROL OF RAILWAY TRAINS.
APPLICATION FILED JAN. 15, 1908.

932,928.

Patented Aug. 31, 1909.
5 SHEETS—SHEET 1.

WITNESSES
R A Balderson
W W Swartz

INVENTOR
Robt. J. White,
by Bakewell, Byrnes & Parmelee,
his Attys.

R. J. WHITE.
APPARATUS FOR THE CONTROL OF RAILWAY TRAINS.
APPLICATION FILED JAN. 15, 1908.

932,928.

Patented Aug. 31, 1909.
5 SHEETS—SHEET 2.

WITNESSES
R A Balderson
C W W Swartz

INVENTOR
Robt. J. White,
by Bakewell, Byrnes & Parmelee
his Attys.

R. J. WHITE.
APPARATUS FOR THE CONTROL OF RAILWAY TRAINS.
APPLICATION FILED JAN. 15, 1908.

932,928.

Patented Aug. 31, 1909.
5 SHEETS—SHEET 4.

WITNESSES
R. A. Balderson
W. W. Swartz

INVENTOR
Robt. J. White
by Balmuth, Byrnes & Parmelee,
his Attys.

R. J. WHITE.
APPARATUS FOR THE CONTROL OF RAILWAY TRAINS.
APPLICATION FILED JAN. 15, 1908.

932,928.

Patented Aug. 31, 1909.
5 SHEETS—SHEET 5.

WITNESSES
R A Balderson
W W Swartz

INVENTOR
Robt. J. White,
by Bakewell, Byrnes & Parmelee,
his Attys.

932,928. APPARATUS FOR THE CONTROL OF RAILWAY-TRAINS. ROBERT J. WHITE, Wilkinsburg, Pa. Filed Jan. 15, 1908. Serial No. 410,918.

*To all whom it may concern:*

Be it known that I, ROBERT J. WHITE, of Wilkinsburg, Allegheny county, Pennsylvania, have invented a new and useful Apparatus for the Control of Railway-Trains, of which the following is a full, clear, and exact description, reference being had to the accompanying drawings, forming part of this specification, in which—

Figs. 4 and 5 are detail views hereinafter referred to.

My invention has relation to apparatus for the control of railway trains, and is designed to provide means of this character which will obviate the employment of block and other track signals, together with the operating stations and mechanisms therefor, and which will enable the engineer to determine the position of the next train in advance and also the condition of the track in advance of this train, by means of signals or indicating devices within the cab of his engine.

In accordance with my invention, each locomotive cab is provided with a dial upon which is automatically indicated the distance traveled by the trains from a starting point or division terminal, and which also automatically indicates the position of the next train in advance. The first-named indication or reading on the dial being accomplished by the movement of the train which carries it, and the second reading being given by the movements of the train in advance through the medium of electrical impulses transmitted through a suitable circuit. Each cab is also provided with means whereby the position of that train may by manual operation be signaled back to the next train in the rear, when the train in advance receives a signal that a following train has entered upon the same division.

My invention also provides means whereby the opening of a switch, the displacement of a rail, etc., will at once be indicated to the train in the rear. It also includes various other features incidental to the main features above stated, and which will hereinafter appear.

The precise nature of my invention will be best understood by reference to the accompanying drawings, in which I have shown one embodiment thereof, it being premised, however, that it is susceptible of various other embodiments by those skilled in the art, without departing from the spirit and scope of my invention as defined in the appended claims.

I desire to be understood that in this specification and in the claims, wherever I have used the word "engine" or "locomotive" I desire these terms to be understood as including any railway motive device, also that the word "train" as used herein and in the claims be understood as referring either to any number of connected cars or vehicles, or to a single car or vehicle.

In carrying out my invention, I provide in the cab of each locomotive a dial which will be hereinafter designated as "home dial", and which is arranged to be traversed by two hands or pointers, the reading given by one hand or pointer being the distance traveled by that train, and the reading given by the other hand or pointer showing the distance traveled by the next train in advance. The first named hand or pointer is actuated by the movement of the first named train, while the second hand or pointer is actuated by local impulses caused by the movement of the train in advance and transmitted back through a suitable circuit and operating mechanism.

Figure 10:
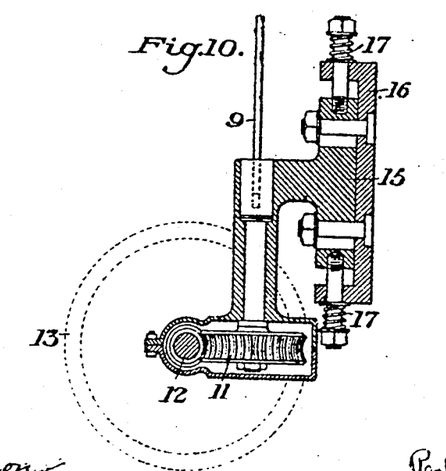
Fig. 10 is a detail view showing the driving gear.

In the drawings, the numeral 2 designates the home dial, which is fixed in the front of a suitable inclosing casing 3, and 4 and 5 are the two hands or pointers which are arranged to traverse this dial. The pointer 5 is carried by a sleeve 6, which is rotatably mounted on a shaft $6^a$ supported in suitable bearings within the casing 2 and which carries a worm wheel 7. The teeth of this worm wheel are engaged by a worm 8, which is carried by a vertical shaft or spindle 9 formed in two sections, which are normally connected by a clutch device 10 (see Fig. 1). The lower section of this shaft extends downwardly through the floor of the cab, and is connected by worm gearing 11 with a shaft 12, to which is secured a wheel 13 arranged to travel on one of the track rails 14 (see Figs. 1 and 10). The shaft 12 is journaled in a frame or support 15, which has a limited vertical play in a frame or bracket 16 so as to permit a slight movement of the wheel 13 due to any inequalities in the track, springs 17 being provided to cushion this movement. The worm gearing 7, 8 and 11 is proportioned to give a certain speed of rotation to the worm wheel 7 and thereby to the hand or pointer 5, in accordance with the markings or divisions on the dial 2, so that when the train has traveled a certain distance, that distance will be correctly indicated by the hand or pointer 5 on the dial 2. While I might employ a gear connection with one of the locomotive axles for the purpose of actuating the hand or pointer 5, I prefer to provide a special wheel 13 for this purpose in order to avoid errors which might otherwise result from the difference in diameters of the regular locomotive wheels. The wheel 13 will in each case be of standard diameter.

Loosely mounted on the upper section of the shaft 9 is a sleeve 18, which is arranged to be connected with the shaft 9 to rotate therewith through the medium of a clutch 19. Secured to this sleeve, and insulated therefrom, is a disk 20 of conducting material having therein an insulating segment 21. Bearing upon opposite faces of this disk 20 are contact brushes 22 which are connected with an electric circuit hereinafter described. The arrangement of the insulating section 21 is such that at each revolution of the shaft 9 and the sleeve 18 this circuit will be once broken.

Figures 1, 2:
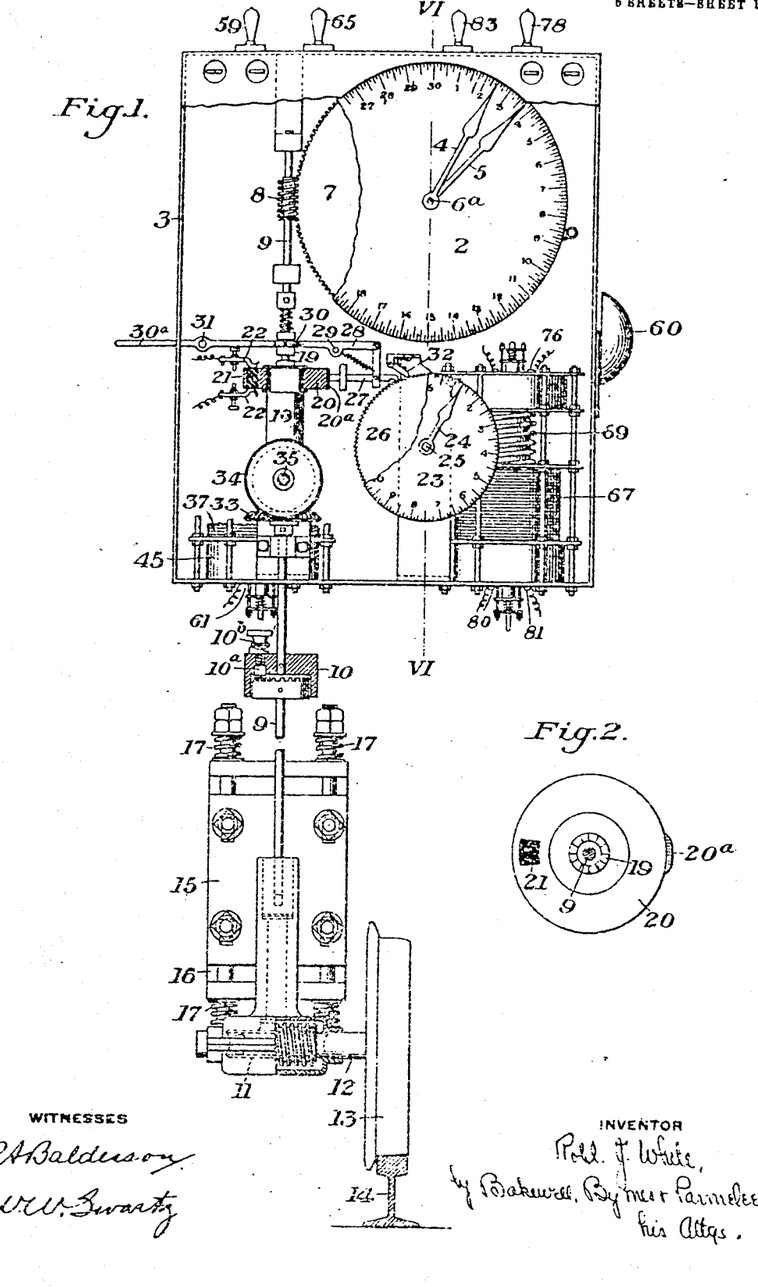
Figure 1 is a front elevation with the face plate of the casing removed, showing the apparatus in the locomotive cab, and the manner of operating the same.
Fig. 2 is a detail view of the circuit-making and breaking device for the signaling mechanism.

23 designates a second fixed dial, which will hereinafter be termed the "signaling" dial, and which is arranged to be traversed by a hand or pointer 24. Secured on the shaft 25 which carries this hand or pointer, is a ratchet disk 26 whose teeth are arranged to be engaged by a pawl 27 which is carried by a lever 28 pivoted at 29 and having a forked arm 30 which engages the hub of the movable member of the clutch 19 before referred to. $30^a$ is a hand lever pivoted at 31, and also arranged to engage said movable clutch section as shown in Fig. 1. When the lever 30 is moved to the position shown in Fig. 1 to disengage the clutch 19, the movement of the clutch member will actuate the lever 28 to move the pawl 27 into the engaging position shown in Fig. 1; but when the lever 30 is actuated to throw the clutch into engagement, the lever 28 is actuated to throw the pawl 27 out of engagement with the wheel 26.

32 is a retaining pawl for the wheel 26. Secured to the lower end of the sleeve 18 is a bevel wheel 33, whose teeth are engaged by the teeth of a bevel wheel 34 carried by a shaft 35 having an operating handle 36. The disk 20 above referred to has a peripheral cam projection 20ª (see Fig. 2), which is designed to engage the end of the sliding pawl 27 once during each revolution of the disk, when the pawl has been placed in engagement with the wheel 26 in a manner before described, and thereby impart a movement to the wheel 26 and hand 24 equal to one tooth for each revolution of the shaft and of the sleeve 18.

Figure 4:
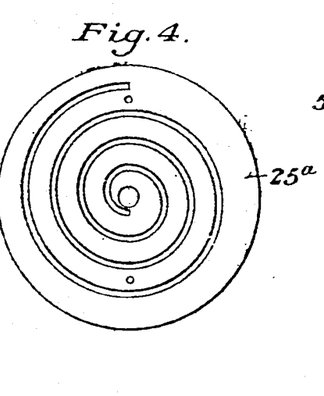
Figure 6:
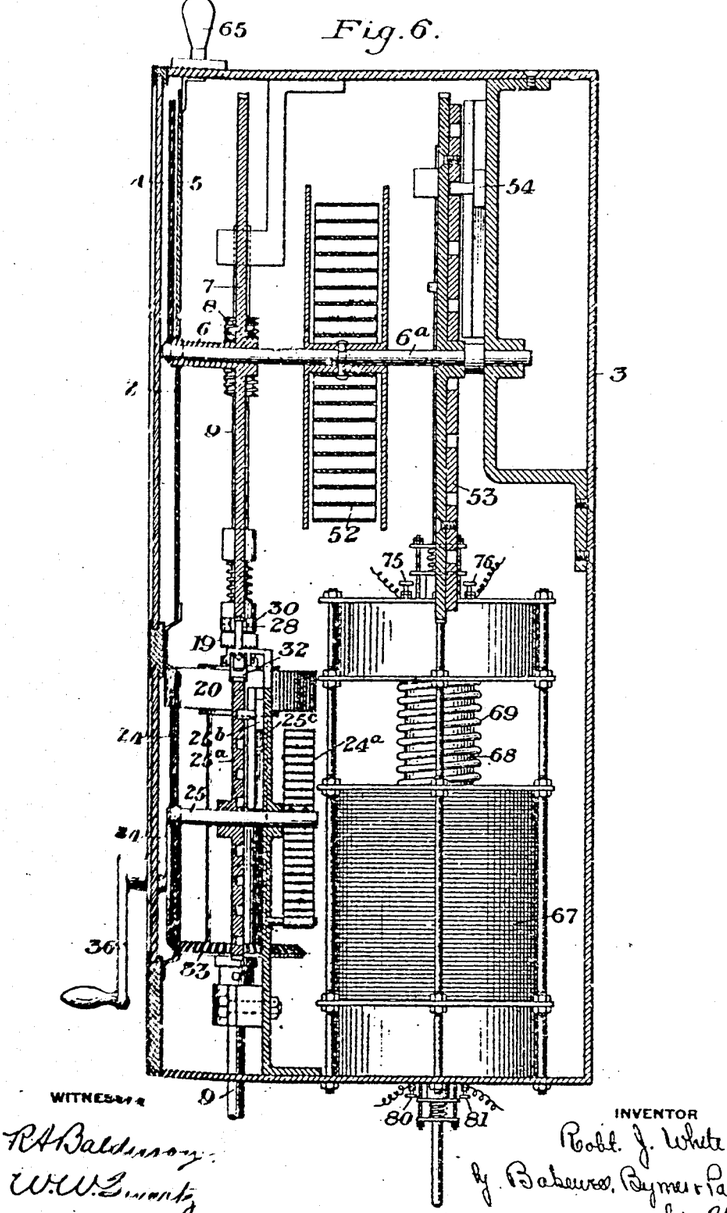
Fig. 6 is a section on the line VI—VI of Fig. 1.

The hand or pointer 24 is designed to be returned to its initial position after operation by the action of a coil spring 24ª which is secured at one end to the shaft 25 and which is wound up by the rotation of said shaft in a clockwise direction. For the purpose of stopping the pointer at its zero position when the spring acts to move it in an anti-clockwise direction, I provide the spirally grooved disk 25ª (see Figs. 4 and 6), which is engaged by a key 25ᵇ which is arranged to slide in the radial guideway 25ᶜ. As the spring 24ª is wound up by the clockwise rotation of the shaft 25, the key 25ᵇ will move radially inward in the guides 25ᶜ until it reaches the inner end of the spiral groove in the disk 25ª. When the disk 25ª is rotated in the reverse direction, the key 25ᵇ moves outwardly in its guides as its inner end follows the spirals of the groove, until by its engagement with the outer end of the groove it stops the disk and thereby the shaft at the proper point.

Figure 3:
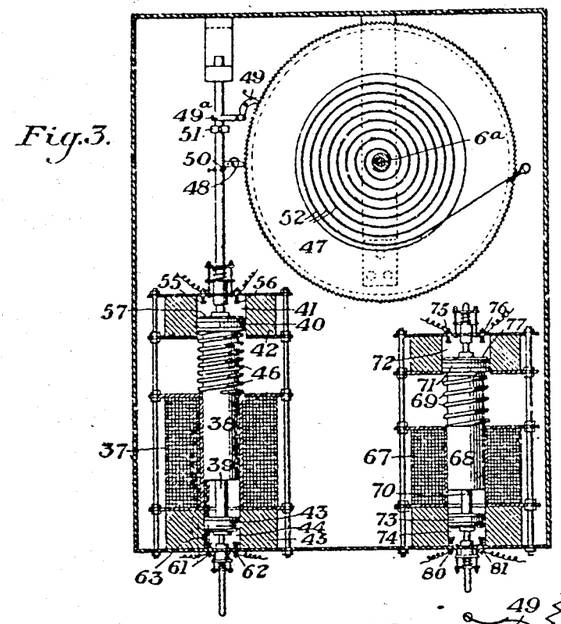
Fig. 3 is a section showing a portion of the apparatus on the locomotive cab.

The mechanism which has been described constitutes the sending or transmitting apparatus which is located on each cab. The receiving mechanism will now be described. Located in each cab is a solenoid magnet 37 having a movable plunger or core 38 carried by a shaft or spindle 39. The coil 37 on each cab is included in an electrical circuit which is controlled by the disk 20 in the cab of the next train in advance, and is therefore energized and deënergized during each revolution of the disk 20 in the cab of the preceding train. The shaft 39 is extended beyond the core 38 at each end and carries an upper piston 40, which works in a cylinder 41 formed in an upper head 42 (see Fig. 3), and also a lower piston 43 which works in a cylinder 44 carried in a lower head 45. These pistons and cylinders are provided for the purpose of acting as dash-pots to cushion the movement of the core 38. The core 38 and its shaft 39 are arranged to be drawn down into the coil 37 when the latter is energized, and to be actuated in the opposite direction by a coil spring 46.

Figure 5:
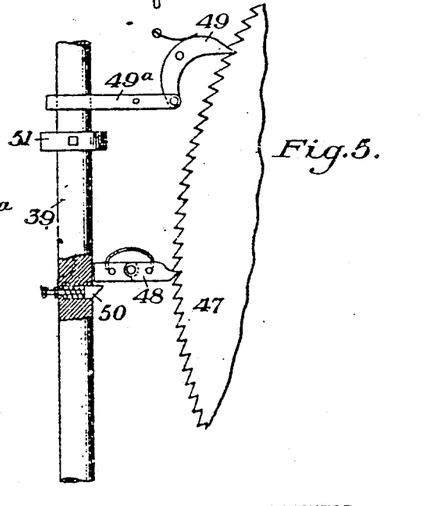

Fixed to the shaft or spindle 6ª is a ratchet disk 47, which is designed to be actuated by a knuckle jointed pawl 48, and held by a retaining pawl 49. The pawl 48 is actuated during each upward movement of the shaft 39 by means of a bevel toothed spring pawl 50 seated in said shaft and arranged to actuate the pawl 48 on its upward movement but to ride by said pawl on its downward movement (see Fig. 5).

51 is a collar secured to the shaft 39 for throwing out the pawl 49 by its engagement with the lever 49ª to which said pawl is pivoted.

By the action of the pawl 48 on the disk 47, the shaft 6ª is rotated by a step by step movement, thereby moving the pointer 4 around the dial 2 in a clockwise direction. The hand or pointer is arranged to be returned to its zero or starting position by means of a spring 52 attached to the shaft 6ª at one end, and which acts similarly to the spring 24ª before described. For the purpose of stopping the hand or pointer 4 at the proper position, the shaft 6ª is provided with a spirally grooved disk 53, which is engaged by a radially sliding key 54, the operation of the disk 53 and key 54 being similar to that of the disk 25ª and key 25ᵇ before described.

Figure 12:
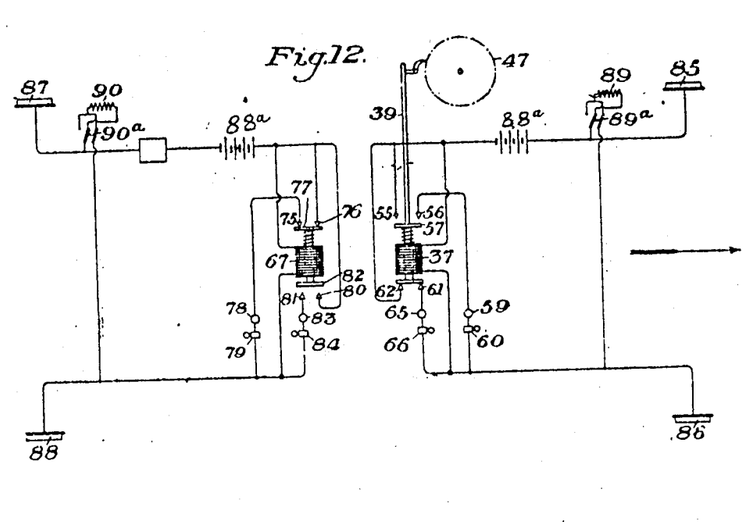

55 and 56 designate electrical contacts, which are designed to be closed by the engagement therewith of a conducting plate 57 on the upper piston. These contacts 56 are connected across the main circuit, as shown in Fig. 12, through a visible signal 59, such as a lamp, and also preferably through an audible signal 60, such as a bell. 61 and 62 are similar contacts which are designed to be engaged and closed by a conductor 63 on the lower piston head 43. These contacts 61 and 62 are also connected across the main circuit, as shown in Fig. 12, through a lamp 65 and bell 66. Within the casing 2 on each cab is a second magnet coil 67 which has a movable core or plunger 68 arranged to be drawn downwardly into the coil 67 when the latter is energized and to be withdrawn from the coil by a spring 69. The shaft 70, by which this core or plunger is carried, is provided with an upper piston 71 working in a cushioning cylinder 72, and also with a lower piston 73 working in a cushioning cylinder 74. The coil 67 is connected in the main receiving circuit in the manner shown in Fig. 12.

75 and 76 are two contacts which are arranged to be closed by a contact piece 77 on the upper piston 71 upon the extreme upward movement of the core or plunger 68. These contacts are connected across the receiving circuit through a lamp 78 and bell 79.

80 and 81 are two contacts, which are arranged to be closed by a contact piece 82 on the lower piston 73 by an extreme downward movement of the core or plunger 68. These contacts 80 and 81 are also connected across the main receiving circuit through a lamp 83 and bell 84.

While for convenience of illustration, in Fig. 12 I have shown four separate bells, 60, 66, 79 and 84, in practice a single bell may be employed having four different clappers each energized by its own circuit.

Figure 11:
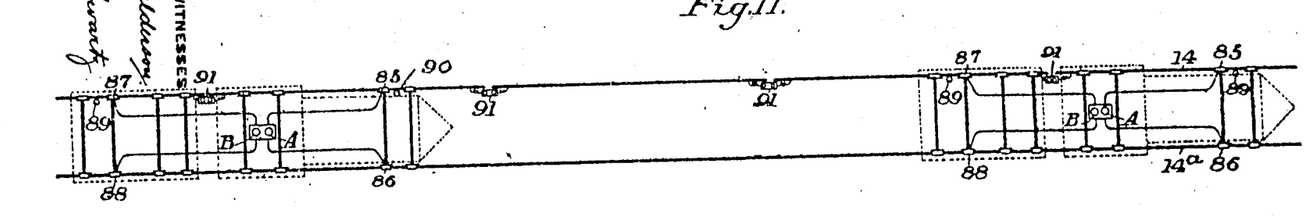
Figs. 11 and 12 are diagrams showing the electrical circuits.

Referring to Fig. 11, the complete main circuits may be traced as follows:—The receiving mechanism A on each cab is electrically connected through one of the pilot wheels 85 with one of the track rails 14, and through a second pilot wheel 86 with the opposite track rail 14$^a$, the two track rails being insulated from each other, and the track rail 14$^a$ being electrically continuous. The circuit is completed through the pilot wheels of the engine of the next train in advance and through the sending mechanism B of that train. The sending mechanism B of each train is connected through one of the tender wheels 87 with the rail 14, and through a second tender wheel 88 with the track rail 14$^a$, the circuit being completed through these rails and through the receiving mechanism of the next train in the rear. These circuits will also appear from Fig. 12, which also shows in detail the circuits on each cab. I have indicated each circuit as provided with a battery 88$^a$ for its source of supply, but obviously any desired source of current may be employed, located either on the cab or connected to the track rails at any desired point.

Figure 8:
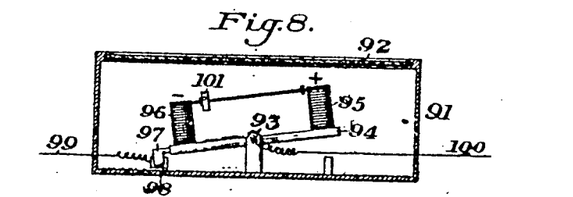
Figure 9:
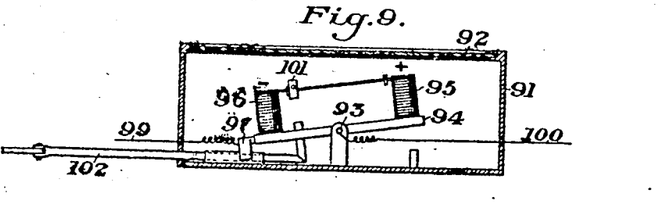

For the purpose of preventing any electrical connection between the sending and receiving mechanism on the same train, whereby the sending mechanism of one train would operate the receiving mechanism of the same train, various means may be employed. For this purpose, I have shown the track rail 14 as composed of insulated sections, the electrical connection between which is effected through a circuit-controlling device actuated by the movement of the trains. (See Figs. 7, 8 and 9.) Suitably placed on each locomotive and depending therefrom, to a point adjacent to the track rail, preferably between the front pilot wheels, is an electro-magnet 89, and preferably between or adjacent to its rear wheels of the tender is a second magnet 90. Placed adjacent to each of the insulated joints between the rail sections is a suitable box or closure 91 having a cover portion 92 of non-magnetic material. Pivoted within this box at 93 is a rocking bar 94 having at one end a magnet 95 of one polarity, and at its opposite end a magnet 96 of opposite polarity. On one end of the bar 24 is a contact 97 which is designed to move into and out of electrical engagement with a fixed contact 98. The fixed contact 98 is connected by wire 99 with one of the sections of the rail 14, and the other rail section is connected by a conductor 100 with the bar 94 through the pivot 93. The sections of the rail 14 are of such length that the two magnets 89 and 90 carried by the locomotive will always be upon opposite sides of one of these joints. The bar 93 of each box is provided with a weight 101, which acts to hold the contacts 97 and 98 in circuit-closing engagement.

Figure 7:
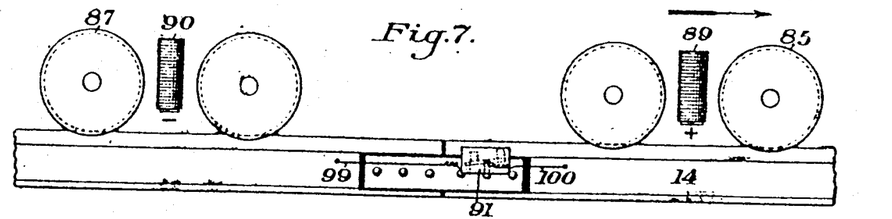
Figs. 7, 8 and 9 are detail views largely diagrammatic illustrating the means for preventing short-circuits between the transmitting and receiving mechanisms on the locomotive.

Supposing the train to be going in the direction shown by the arrow in Fig. 7, the front magnet 89 will by its attractive action upon the magnet 96 of opposite polarity and its repulsive action upon the magnet 95 of like polarity, move the bar 94 to separate the contacts 97 and 98 and thereby break the continuity of the circuit between the front pilot wheel 85 and the rear tender wheel 87; and the circuit will remain thus broken until the rear magnet 90 passes the joint, when the repulsive action between the magnet 90 and the magnet 96 of like polarity and the attractive action between the magnet 90 and the magnet 95 of opposite polarity will actuate the bar 94 to again close the circuit at the contacts 97 and 98. The circuit will be held closed by the action of the weight 101 until a succeeding train comes along. In this manner the electrical continuity of the rail 14 is always broken between the receiving and the sending mechanism of each train. In order to operate these circuit-closing devices, when the train is running backward, the magnets 89 and 90 may be each connected with a reversing switch 89$^a$ and 90$^a$, whereby its polarity can be reversed.

The operation is as follows:—Each train as it starts out from its starting point or divisional terminal has the pointer 5 of its home dial 2 set at zero or starting point, and the movement of the train through the mechanisms described, causes said hand to traverse the dial and indicate at each moment the distance which the train has traveled. When there is a succeeding train upon the same division, such train at once closes the circuit through the sending mechanism of the train ahead. This energizes the magnet coil 67 and causes the circuit to be closed between the contacts 80 and 81 in the train ahead, thereby lighting the light 83 and ringing the bell 84. The engineer of the train ahead is thus at once notified that a second train is following him, and it is his duty to at once signal back to the engineer of the following train his position on the division; or, what is the equivalent, the distance to which he has traveled. To do this, he raises the lever 30$^a$, thereby disengaging the clutch 19 and throwing the pawl 27 into engagement with the ratchet wheel 26 which actuates the hand 24 of the signaling dial. He then rotates the sleeve 18 through the hand-operated wheel 34 until the hand 24 shows the same reading on the dial 23 that the hand 5 shows on the dial 2. At each rotation of the sleeve 18 and disk 20, the electrical circuit is broken at the contacts 22, which thereby breaks the circuit of the coil 37 in the train behind and gives a series of impulses to the ratchet-operating shaft 39. These movements of the shaft 39 actuate the pawl 48 and thereby the ratchet wheel 47. The pointer 5 of the receiving mechanism in the train in the rear will thereby be moved on the dial 2 to give a reading equal to the reading on the signaling dial 23, which in turn is equal to the distance traveled by the train in advance. The engineer of the train in the rear is thus informed of the precise position of the train ahead. After the distance traveled by the train ahead has thus been signaled, the engineer of the train ahead throws the clutch 19 back into engagement, thereby throwing the pawl 27 out of engagement with the wheel 26 and also knocking off the retaining pawl 32, and the hand 24 is at once returned to zero or starting position by its spring $24^a$. The throwing into engagement of the clutch 19 now causes the sleeve 18 to be rotated by the shaft 9, and at each rotation of said shaft the circuit of the magnet coil 37 of the train in the rear is broken, giving an impulse to the shaft 39 to actuate the ratchet wheel 47 one step. Therefore, after the engineer of the front train has once signaled back his position, the pointer 5 on the home dial of the following train is automatically moved to indicate the position of the train ahead at all times; and the engineer of the train in the rear by noting the distance between the two pointers 4 and 5 can at all times determine exactly how far ahead of him the preceding train is.

If it becomes necessary for the front train to back upon a siding, the clutch 10, as will appear from Fig: 1, is so constructed as to operate to drive the upper section of the shaft 9 in one direction only. This is because of the fact that the clutch tooth $10^a$, which is carried by the clutch member on the upper section of the shaft 9, is so beveled that it will ride freely over the teeth of the clutch member carried by the lower section of the shaft 9 in one direction of rotation. Therefore, when the wheel 13 is rotated in a backward direction, the upper section of the shaft 9 will not be rotated. In order, however, to prevent the sending of a false reading back to the following train when the train in advance again moves forward, the engineer of the train in advance withdraws the clutch tooth $10^a$ out of engagement by means of its handle $10^b$, and keeps it out of engagement until the train in advance has again come back onto the main track.

The fact that the train ahead has left the track, is automatically signaled to the engineer of the following train in this manner:— The opening of the switch which permits the preceding train to take the side track, breaks the electrical circuit between the trains or the magnet coil 37 of the train in the rear is broken. This will cause the circuit of the lamp 59 and bell 60 to be closed, thus giving the signal to the engineer. When the train in front again pulls out upon the main track, the coil 37 is energized, causing the circuit of the lamp 65 and bell 66 to be closed, thus again giving the proper signal to the engineer of the rear train. When the rear train takes a side track, the engineer of the front train is notified of the fact, since the circuit of the coil 67 will be broken, causing his lamp 78 to be lighted and bell 79 to ring. The return of the rear train to the main track will be indicated by the lighting of the lamp 83 and the ringing of the bell 84, and the engineer in front can then signal back the distance which he has traveled while the preceding train has been side-tracked, in the manner before described. The opening of a switch at any point between the trains will of course open the circuit of the coil 37 of the rear train, lighting the lamp 59 and ringing the bell 60, and a similar signal will be given in case of a displaced rail or of any obstruction upon the track of such a nature as to cause a short-circuit between the rails 14 and $14^a$. To insure the positive opening of the circuit by the opening of a switch, a connection 102 (see Fig. 9) may be made from the switch movement into an adjacent box 91 of such character as to actuate the bar 94 to open the circuit at the contacts 97 and 98 when the switch is open and to close said contacts when the switch is closed. It will be understood that the magnet core 38, by reason of the cushioning action of the cylinders at its ends, will, in its ordinary operation simply be vibrated a sufficient distance to actuate the ratchet wheel 47, and that it is only moved a sufficient distance to close the circuits at the contacts 56 and 62 when the magnet is energized or deënergized for a sufficient period to permit of the extreme movement of this plunger.

The advantages of my invention are many. Each engineer, by a simple reading of the home dial located in his cab, can determine the precise location of the train ahead, while by means of the signal devices, he is immediately notified when a train enters the division behind him, and is also notified of the opening of a switch or a rail displacement in the track ahead of him. This is effected without the use of the complicated and expensive track signals commonly employed, which require complicated operating mechanism. The invention also obviates the necessity for signal towers, and operators, together with the danger of error resulting from failure of the operators to properly perform their duties. Should any part of the apparatus fail in its action, the engineers at once are notified of the fact.

It will be obvious that my invention is susceptible of many modifications. Thus, while I have shown the track rails as forming parts of the electrical circuits for the apparatus, it will be obvious that separate conductors, either above or overhead, may be employed for the purpose, contact being made therewith by the trains in any desired manner; or a track rail may be employed for one side of the circuit and a separate special conductor be employed for the other side of the circuit. Various forms of gearing may be employed for actuating the hands or pointers of the dials; any desired arrangement of visual or audible signals, or a combination of both, may be employed in the cabs; and the circuits of these signals may be controlled in various ways from the main circuit. It will also be obvious that the interference between the sending and receiving mechanisms on each train may be prevented in a variety of ways. Thus, these devices may be made respectively responsive to currents of different characters. Many other changes may be made in the details of construction and arrangement, all within the scope of the appended claims.

I claim:—

1. In apparatus for the control of railway trains, mechanism on each train operated by the movement of that train, for indicating at any time the actual distance which it has traveled, and other mechanism on each train operated by the movement of a preceding train to indicate the actual distance traveled by the last-named train; substantially as described.

2. In apparatus for the control of railway trains, mechanism on each train operated by the movement of that train for indicating the distance which it has traveled, other mechanism on each train operated by the movement of a preceding train to indicate the distance traveled by the last named train, and means on each train whereby that train may signal to a preceding train the distance to which the train ahead has traveled from a starting point; substantially as described.

3. In apparatus for the control of railway trains, indicating mechanism on each train for indicating at any time the actual distance traveled by that train, other indicating mechanism on each train for indicating the actual distance traveled by another train, connections for establishing an electric circuit between successive trains, and means on each train for affecting the electrical circuits to thereby actuate indicating mechanism on another train or trains; substantially as described.

4. In apparatus for the control of railway trains, indicating mechanism on each train for indicating the distance traveled by that train, other indicating mechanism on each train for indicating the distance traveled by another train, connections for establishing an electric circuit between successive trains, and means on each train for affecting the electrical circuit to thereby actuate indicating mechanism on another train or trains, together with signaling devices on each train controlled by said circuits and indicating mechanisms; substantially as described.

5. In apparatus for the control of railway trains, indicating mechanism on each train for indicating the distance traveled by that train, other indicating mechanism on each train for indicating the distance traveled by another train, connections for establishing an electric circuit between successive trains, means on each train for affecting the electrical circuit to thereby actuate indicating mechanism on another train or trains, signaling devices on each train controlled by said circuits and indicating mechanisms, together with means whereby each train may signal to a train in the rear the distance to which the train in advance has traveled; substantially as described.

6. In apparatus for the control of railway trains, a distance indicator on each train for showing the actual distance traveled by the train at any time from a given starting point, means for establishing an electric circuit between adjacent trains, and means on each train affecting said circuit to thereby operate the indicating mechanism on another train; substantially as described.

7. In apparatus for the control of railway trains, a distance indicator on each train operated by the movement of that train to show the actual distance traveled by the train at any time from a given starting point, a second distance indicator on each train operated by the movement of another train, connections for establishing an electric circuit between successive trains, a device on each train operated by the movement of that train for affecting the electrical circuit to operate one of the distance indicating mechanisms on another train, and mechanism on each train responsive to changes in its circuit for operating its second distance indicator; substantially as described.

8. In apparatus for the control of railway trains, a distance indicator on each train operated by the movement of that train, a second distance indicator on each train operated by the movement of another train, connections for establishing an electric circuit between successive trains, a device on each train operated by the movement of that train for affecting the electrical circuit to operate one of the distance indicating mechanisms on another train, and mechanism on each train responsive to changes in its circuit for operating its second distance indicator, together with means for manually affecting said circuit to operate the second distance indicator of another train; substantially as described.

9. In apparatus for train control, means for establishing an electrical connection between each train and a following and preceding train, indicating mechanism on each train, means on each train for affecting the circuit connecting it with the preceding train, to operate the indicating mechanism on the preceding train, and means on each train for affecting the circuit connecting it with the following train to operate the indicating mechanism on the following train; substantially as described.

10. In apparatus for train control, means for establishing an electrical connection between each train and a following and preceding train, indicating mechanism on each train, means on each train for affecting the circuit connecting it with the preceding train, to operate the indicating mechanism on the preceding train, means on each train for affecting the circuit connecting it with the following train to operate the indicating mechanism on the following train, together with means for preventing interference between the sending and receiving circuits of each train; substantially as described.

11. In apparatus for train control, a dial on each train, and two hands or pointers arranged to traverse said dial, one of said hands or pointers being actuated by the movement of its own train, and the other hand or pointer being actuated by the movements of another train; substantially as described.

12. In apparatus for train control, a dial, two hands or pointers arranged to traverse said dial, a wheel arranged to travel on one of the track rails, gearing connecting said wheel with one of the hands or pointers, and means operated by the movement of a preceding train for operating the other hand or pointer; substantially as described.

13. In apparatus for train control, a dial, a hand or pointer arranged to traverse the same, gearing actuated by the movement of the train for actuating the hand or pointer to show the actual distance traveled by the train at any time from a given starting point, and means for throwing said gearing out of operation; substantially as described.

14. In apparatus for the control of railway trains, a distance-indicating dial, a hand or pointer arranged to traverse said dial, connections operated by the movement of the train for actuating the hand or pointer to show the actual distance traveled by the train at any time from a given starting point, a signaling dial, means for actuating the signaling dial independently of the first-named dial, and means in connection with the signaling dial and its operating mechanism for affecting an electrical circuit extending to another train; substantially as described.

15. In mechanism of the character described, a signaling dial, a pawl for actuating the same, manual means for operating said pawl, and mechanism for throwing the pawl into and out of operation; substantially as described.

16. In mechanism of the character described, a signaling dial, manual means for operating the dial, and a circuit making and breaking device in connection with said manual operating means; substantially as described.

17. In mechanism of the character described, a dial for indicating at any time the actual distance traveled by a train from a given starting point, said dial being mounted on the train, gearing actuated by the movement of the train for operating the dial, said gearing including a shaft, a circuit making and breaking device carried by said shaft, and means for establishing an electrical circuit with another train, which circuit is controlled by said making and breaking device; substantially as described.

18. In mechanism of the character described, a distance indicating dial, gearing for operating said dial operated by the movement of the train, a circuit-making and breaking device also operated by said gearing, and means whereby the circuit-making and breaking device may be thrown out of connection with said gearing and operated manually; substantially as described.

19. In mechanism of the character described, a distance indicator, pawl mechanism for operating said indicator by a step by step movement, an electro-magnet for operating the pawl mechanism, together with means for returning the distance indicator to its zero or starting position; substantially as described.

20. In mechanism of the character described, a distance indicator, a pawl device for operating the same, an electro-magnet having a movable core arranged to operate the pawl device, and means for retarding the movements of said core; substantially as described.

21. In mechanism of the character described, a distance indicator, a pawl device for operating the same, an electro-magnet having a movable core arranged to operate the pawl device, means for retarding the movements of said core, together with circuit-controlling devices adapted to be actuated by extreme movements of said core, and signals connected with the circuits of said devices; substantially as described.

22. In mechanism of the character described, mechanism on each train, operated by the movement of the train, for indicating at all times the actual distance which the train has traveled from a given starting point, other mechanism on each train whereby the distance so traveled by it can be signaled to another train through an electrical circuit connecting the two trains, a conductor constituting a portion of such circuit and composed of insulated sections, circuit closing devices adjacent to the points between said sections for making and breaking the electrical connection between the sections, and means carried by the trains for operating said devices; substantially as described.

23. In mechanism of the character described, a sectional conductor having insulated joints, a circuit controlling device, and connections for making and breaking an electric circuit between said sections across a joint, magnets for operating said devices, together with coöperating magnets carried by the trains; substantially as described.

24. In apparatus for the control of railway trains, means for establishing an electric circuit between adjacent trains, means for indicating on each train the actual distance traveled by that train at any time from a given starting point, and also the actual distance traveled by the train in advance, and signal mechanism arranged to indicate on each train the entry of a following train upon the same division of road; substantially as described.

25. In apparatus for the control of railway trains, means on each train for indicating the actual distance traveled by that train at any time from a given starting point, and also for indicating the actual distance traveled by a train in advance, and signaling mechanism on each train for indicating the entry of a train in rear upon the same division of road, and also for indicating when a train in advance has left the track; substantially as described.

26. In mechanism for the purpose described, means for establishing electrical connection between adjacent trains, means on each train for indicating the actual distance traveled by that train at any time from a given starting point, and also the actual distance traveled by another train, and signal mechanism on each train, together with means for operating the signal mechanism to indicate other track conditions ahead of each train; substantially as described.

In testimony whereof, I have hereunto set my hand.

ROBERT J. WHITE.

Witnesses:
 JOHN MILLER,
 H. M. CORWIN.